United States Patent [19]

Nakanishi et al.

[11] Patent Number: 5,587,821

[45] Date of Patent: Dec. 24, 1996

[54] LIQUID CRYSTAL DISPLAY DEVICE HAVING A PARTICULAR COMPENSATOR

[75] Inventors: Hiroko Nakanishi, Uji; Hiroshi Ohnishi, Nara, both of Japan

[73] Assignee: Sharp Kabushiki Kaisha, Osaka, Japan

[21] Appl. No.: 363,377

[22] Filed: Dec. 23, 1994

[30] Foreign Application Priority Data

Dec. 27, 1993 [JP] Japan .................. 5-332681

[51] Int. Cl.$^6$ .................. G02F 1/1335; C09K 19/02
[52] U.S. Cl. .................. 349/118; 349/180
[58] Field of Search .................. 359/73, 63, 54, 359/102

[56] References Cited

U.S. PATENT DOCUMENTS

| | | | |
|---|---|---|---|
| 5,048,933 | 9/1991 | Asano | 359/63 |
| 5,194,975 | 3/1993 | Akatsuka | 359/73 |
| 5,235,450 | 8/1993 | Yoshimura | 359/73 |
| 5,237,438 | 8/1993 | Miyashita | 359/73 |
| 5,291,323 | 3/1994 | Ohnishi | 359/73 |
| 5,400,158 | 3/1995 | Ohnishi | 359/73 |
| 5,472,635 | 12/1995 | Iida | 359/73 |
| 5,473,455 | 12/1995 | Koike | 359/76 |

FOREIGN PATENT DOCUMENTS

| | | |
|---|---|---|
| 5-210099 | 8/1993 | Japan . |
| 5-323289 | 12/1993 | Japan . |
| 688962 | 3/1994 | Japan .................. 359/63 |
| 6-194645 | 7/1994 | Japan . |

*Primary Examiner*—William L. Sikes
*Assistant Examiner*—Tiep H. Nguyen
*Attorney, Agent, or Firm*—David G. Conlin; William J. Daley, Jr.

[57] ABSTRACT

It is an object of the invention to improve the viewing angle properties of a liquid crystal display device by controlling the state of orientation of liquid crystal molecules. The liquid crystal display device is constructed with an liquid crystal display element disposed between a pair of polarizing plates, and with phase difference plates disposed between each polarizing plate and the liquid crystal display element. The phase difference plates are selected so that $nx \geq nz > ny$ is satisfied and the Nz value is in the range of $0 \leq Nz \leq 0.5$. The liquid crystal display element is constructed by placing a liquid crystal layer between substrate members prepared by forming transparent electrodes and orientation films in the pair of light transmitting plates, and the liquid crystal layer sandwiched between the transparent electrodes is used as picture elements. One picture element contains mixed liquid crystal molecules with different pretilt angles controlled by a light irradiation step after application and baking of the film material for the orientation films As a result, it is possible to obtain excellent display quality in both of the opposing viewing angle directions.

4 Claims, 11 Drawing Sheets

LIQUID CRYSTAL DISPLAY DEVICE HAVING A PARTICULAR COMPENSATOR

BACKGROUND OF THE INVENTION

1. Field of the Invention

The present invention relates to liquid crystal display devices with a controlled state of the orientation film surface and liquid crystal molecules with different pretilt angles present in admixture in a single picture element, and more particularly it relates to STN (super twisted nematic)-type liquid crystal display devices with excellent viewing angle properties which are widely used as display device means in OA (office automation) devices such as word processors and personal computers.

2. Description of the Related Art

STN-type liquid crystal display devices employ a liquid crystal display element wherein a liquid crystal layer is sandwiched between a pair of substrate members at least one of which is transparent, and the liquid crystal molecules have a twisted orientation of 180° to 270° between the substrate members. The display of the STN-type liquid crystal display devices is colored because of the effect of birefringence of the liquid crystal molecules, and by selecting the placement of the polarizing plate, the display may be colored, for example, "yellowish green" or "blue". In addition, DSTN (double-layered super twisted nematic)-type liquid crystal display devices employ, as a liquid crystal element for color compensation, the liquid crystal element wherein the twisted orientation of the liquid crystal molecules is opposite to that of the above-mentioned liquid crystal display element. Since the coloration produced with the liquid crystal display element is offset by using color-compensating liquid crystal element, an achromatic display is obtained. However, the above-mentioned DSTN-type of liquid crystal display devices have the problem that such display device is thick and heavy because two liquid crystal elements are used.

In order to achieve achromatic displays and thinner and lighter display devices, another type of liquid crystal display device has been proposed, i.e. one which employs a phase difference plate instead of the color-compensating liquid crystal element. Phase difference plates, obtained by uniaxially orienting polymer films, make it possible to produce thinner and lighter liquid crystal display devices. In addition, as the phase difference plate there has been proposed the use of uniaxial oriented polymer films satisfying the relationship $nx \geq nz > ny$ and having a value of Nz with a range of $0 \leq Nz \leq 0.5$, where nx, ny and nz are the refractive indexes in the three-dimensional directions of the film. Here, the value of Nz is a value represented by $Nz=(nx-nz)/(nx-ny)$. Thus, the degree of change of the retardation value of the liquid crystal display element, i.e. the product $d \cdot \Delta n$ of the thickness d of the liquid crystal layer of the liquid crystal display element and the refractive index anisotropy of the liquid crystal molecules $\Delta n$, due to the viewing angle, is roughly identical to the degree of change of the retardation value of the phase difference plate due to the viewing angle, and thus a liquid crystal display device with extended viewing angle properties can be obtained.

In other words, the liquid crystal molecules of the liquid crystal display element have a twisted orientation between the pair of substrate members, while forming a pretilt angle C as shown in FIG. 14. Furthermore, the liquid crystal molecules have a refractive index anisotropy $\Delta n$ as mentioned above. This means that liquid crystal display elements have different retardation values with respect to the display device surface depending on the viewing angle orientation (tilt angle orientation) formed upward from the display device surface. The former type of phase difference plates are made of a uniaxial oriented polymer film, and therefore color compensation can only be made in a specific viewing angle direction. However, the latter type of phase difference plate has its refractive index in three directions controlled, which thus widens the viewing angle range to obtain a satisfactory display.

FIG. 14 is a sectional view of the state of orientation of liquid crystal molecules 7a of a conventional liquid crystal display element 8. The above-mentioned pretilt angle C is an angle formed between each of the surfaces of the orientation films 5, 6 in contact with the liquid crystal layer 7 of the substrate members 1, 2 and the longitudinal direction of the liquid crystal molecules 7a closest to the surface of the oriented films 5, 6. Here, the substrate members 1, 2 are each provided with at least the orientation films 5, 6 on, for example, a pair of transparent plates 3, 4.

Additionally, in a STN-type liquid crystal display device, the phase difference plate used is a one having a property of $nx \geq nz > ny$, namely, which has a phase difference not only in a plane parallel to the surface of the phase difference plate, but also in the thickness direction. Owing to the phase difference in the plane parallel to the surface of the phase difference plate is compensated during non-select voltage application the color tone of the off state, which intercepts the light during non-select voltage application, and the color change at a viewing angle inclining to the direction parallel to a display surface is compensated by the phase difference thickness direction.

In a TN-type liquid crystal display device wherein liquid crystal molecules are oriented with a twist of 90° between a pair of substrate members, a phase difference plate having a phase difference not in a surface parallel to the surface thereof, but only in the thickness direction, used to compensate the color tone of the normally white mode in which light is transmitted through the phase difference during non-select voltage application.

Thus, the performance requirements are different between the phase difference plates employed for a TN- and a STN-type liquid crystal display device, and accordingly when the phase difference plate to be used for a TN-type one is employed for a STN-type one, a desired effect can not be obtained.

In a STN-type liquid crystal display device, the above-mentioned type of phase difference plates are provided in order to achieve an achromatic display and a thinner and lighter-weight display device, but no color compensation can be obtained in the reverse viewing angle direction of the display device, while what are obtained from the reverse viewing angle are only images with a low-contrast, those with different colors, and light/dark inverted images, in which occurs a so-called reversal phenomenon. This is because the liquid crystal molecules 7a of the liquid crystal display element 8 have the pretilt angle C, and the refractive indexes of the liquid crystal molecules 7a differ when observed from the 6 o'clock direction (normal viewing angle direction) indicated by the arrow 9 and the 12 o'clock direction (reverse viewing angle direction) indicated by the arrow 10.

FIGS. 15A, 15B are illustrative sectional views for a more detailed explanation of the state of orientation of the liquid crystal molecules 7a. FIG. 15A shows the state as seen from the 6 o'clock direction (normal viewing angle direction)

indicated by the arrow 9 in FIG. 16, and FIG. 15B shows the sate as seen from the 9 o'clock direction (left viewing angle direction) indicated by the arrow 11 in FIG. 16. The liquid crystal molecules 7a are oriented along the rubbing direction of the oriented films 5, 6 of the substrate members 1, 2, and have the pretilt angle C as mentioned above. They are also oriented with a twist of, for example, 240° between the substrate members 1, 2. That is, the substrate members 1, 2 are arranged so that the liquid crystal molecules 7a are oriented with a twist of 240° therebetween. Here, the longitudinal direction of the liquid crystal molecules 7ac positioned in the almost middle of the substrate members 1, 2 is selected, for example, so oughly parallel to the 6 o'clock–12 o'clock direction. The intermediate molecules 7ac are also tilted at the above-mentioned angle C.

Observing this type of conventional liquid crystal display element 8 from the normal viewing angle direction and reverse viewing angle direction 10, the refractive indexes of the liquid crystal molecules 7a in each of the viewing angle directions 9, 10 are different, and the retardation value is no longer symmetrical in the normal viewing angle direction 9 and reverse viewing angle direction 10. Consequently, with the phase difference plates formed by uniaxial orientation, it is impossible to carry out color compensation simultaneously for both the normal viewing angle direction 9 and the reverse viewing angle direction 10, leading to the inconveniences as described above.

In Japanese Unexamined Patent Publication JPA 5-210099 (1993) is disclosed an example of a TN-type liquid crystal display device wherein the above-mentioned inconveniences are preferably dissolved. In the liquid crystal display device, a part of one at the liquid crystal layer side, of two laminated orientation films with different orientation directions is peeled. The orientation film is generally formed to have a thickness of hundreds A, and according to the publication, a number of irregularities are formed in the surface of the orientation film. In a TN-type liquid crystal display device, irregularities having a thickness of about 100 A adversely affect the image quality only in a small extent, while in a STN-type liquid crystal display device, even such irregularities adversely affect the image quality in a great extent. More concretely, the orientation state of liquid crystal molecules becomes disordered, which causes lowering of contrast ratio.

SUMMARY OF THE INVENTION

It is an object of the present invention to provide a liquid crystal display device with excellent viewing angle properties, by using a phase difference plate with an excellent color compensating effect and with the state of the orientation film surface controlled.

The present invention relates to a liquid crystal display device comprising: a pair of polarizing plates; a liquid crystal display element disposed between the pair of polarizing plates, the element including: a pair of substrate members at least one of which is transparent, and a super twisted nematic-type liquid crystal layer of the liquid crystal molecules having a twisted orientation of 180° to 270°, the liquid crystal layer sandwiched between the substrate members, the pair of substrate members each including both an electrode for applying a voltage to the liquid crystal layer and an orientation film in contact with the liquid crystal layer, and phase difference plates placed between each of the pair of polarizing plates and the liquid crystal display element, wherein the liquid crystal layer interposed between the electrodes is used as picture elements; liquid crystal molecules with different pretilt angles are mixed in a single picture element; and the phase difference plates are selected so that $nx \geq nz > ny$ is satisfied and the value of Nz represented by $Nz=(nx-nz)/(nx-ny)$ is in the range of $0 \geq Nz \geq 0.5$, where nx, ny and nz are the refractive indexes in the three-dimensional directions of each phase difference plate.

Further the invention provides a liquid crystal display device wherein the twist angle $\phi$ of the liquid crystal molecules between the pair of substrates members is selected to be 240°, the angle γ contained by an orientation axis of liquid crystal molecules closest to the orientation film possessed by a one of the pair of substrate members and an absorption axis of the polarizing plate on the side of the one substrate member is selected to be in the range of 40° to 50° the angle δ contained by said orientation axis and the slow axis of the phase difference plate on the side of the one substrate member is selected to be in the range of 70° to 80° the angle ε contained by an orientation axis of liquid crystal molecules closest to the orientation film possessed by an other of the pair of substrate members and the slow axis of the phase difference plate on the side of the other substrate member is selected to be in the range of 100° to 110° the angle ζ contained by the orientation axis of liquid crystal molecules closest to the orientation film possessed by the other of the pair of substrate members and an absorption axis of the polarizing plate on the side of the other substrate member is selected to be in the range of 40° to 50°, and the Nz value of the phase difference plates is selected to be 0.2.

Further the invention is characterized in that the angles γ, δ, ε, ζ are selected to be 45°, 75°, 105° and 45°, respectively.

Further the invention is characterized in that the twist angle $\phi$ of the liquid crystal molecules between the pair of substrates members is selected to be 260°, the angle γ contained by an orientation axis of liquid crystal molecules closest to the orientation film possessed by a one of the pair of substrate members and an absorption axis of the polarizing plate on the side of the one substrate member is selected to be in the range of 15° to 25°, the angle δ contained by said orientation axis and the slow axis of the phase difference plate on the side of the one substrate member is selected to be in the range of 80° to 90°, the angle ε contained by an orientation axis of liquid crystal molecules closest to the orientation film possessed by an other of the pair of substrate members and the slow axis of the phase difference plate on the side of the other substrate member is selected to be in the range of 90° to 100°, the angle ζ contained by the orientation axis of liquid crystal molecules closest to the orientation film possessed by the other of the pair of substrate members and an absorption axis of the polarizing plate on the side of the other substrate member is selected to be in the range of 50° to 60°, and the Nz value of the phase difference plates is selected to be 0.3.

Further the invention is characterized in that the angles γ,δ,ε, ζ are selected to be 20°, 85°, 95°, and 55°, respectively.

According to the invention, the liquid crystal display device is constituted by a liquid crystal display element disposed between a pair of polarizing plates and phase difference plates disposed between each of the pair of polarizing plates and the liquid crystal display element. The liquid crystal display element is constituted by a super twisted nematic-type liquid crystal layer sandwiched between he pair of substrate members a leas one of which is transparent, wherein the liquid crystal molecules are twistedly oriented 180° to 270° between the substrate members, and the pair of substrate members each comprise an electrode for applying a voltage to the liquid crystal layer and an orientation film in contact with the liquid crystal layer. As the picture elements of the liquid crystal display device is used the liquid crystal layer sandwiched between the electrodes, and liquid crystal molecules with different pretilt angles are present in admixture in a single picture element. The pretilt angles are the angles contained by the surface of the orientation film and the longitudinal direction of the liquid crystal molecules in closest to the orientation film. Also, the phase difference plates are selected so that $nx \geq nz > ny$ is satisfied and the value of Nz is in the range of $0 \leq Nz \leq 0.5$, where nx, ny and nz are refractive indexes in the three-dimensional directions. The value Nz is represented by $Nz=(nx-nz)/(nx-ny)$.

In the case where each of the picture elements as seen from above is split into two fractions in a normal viewing angle direction and a reverse viewing angle direction based on, for example, the right/left viewing angle directions, and the fractions have different pretilt angles, the liquid crystal molecules located in the almost middle center of the one and the other side of the liquid crystal layer have inclined opposite directions with respect to the plane parallel to the oriented films. Consequently, the refractive index anisotropies Δn of the liquid crystal molecules as seen from the normal viewing angle direction and the reverse viewing angle direction are roughly symmetrical, and the retardation values as seen from the viewing angle directions, i.e. the product d·Δn of the thickness d of the liquid crystal layer and the refractive index anisotropy Δn of the liquid crystal molecules are roughly symmetrical.

In addition, there are disposed phase difference plates with $nx \geq nz > ny$ and the Nz value in the range of $0 \leq Nz \leq 0.5$, and with controlled refractive indexes in three dimensions. As the viewing angle with the liquid crystal display element is slanted to 6 o'clock–12 o'clock direction, the retardation value of the liquid crystal display element increases. In the case of phase difference plates with a Nz value in the range of $0.5 < Nz \leq 1.0$, i.e. phase difference plates with positive optical properties, as the angle is slanted to the slow axis direction, the retardation value of the phase plate decreases. As a result, when the phase difference plates are used, the retardation values of liquid crystal display element and the phase difference plate in the case of a slanted viewing angle do not agree with each other. However, in the case of phase difference plates with a Nz value in the range of $0 \leq Nz \leq 0.5$, i.e. phase difference plates with negative optical properties, the retardation value of the phase difference plate increases as the viewing angle is slanted to the slow axis direction. Consequently, the viewing angle range which provides an achromatic and satisfactory display is extended due to the color compensating effect.

Accordingly, a liquid crystal display device wherein an extended viewing angle, an achromatic display and excellent viewing angle properties in, for example, both the normal viewing angle direction and the reverse viewing angle direction are achieved can be realized.

Further, according to the invention, the twist angle φ of the liquid crystal molecules between the pair of substrates members is selected to be 240°, the angle γ contained by an orientation axis of liquid crystal molecules closest to the orientation film possessed by a one of the pair of substrate members and an absorption axis of the polarizing plate on the side of the one substrate member is selected to be in the range of 40° to 50°, preferably to be 45°, the angle δ contained by the orientation axis and the slow axis of the phase difference plate on the side of the one substrate member is selected to be in the range of 70° to 80°, preferably to be 75°, the angle ε contained by an orientation axis of liquid crystal molecules closest to the orientation film possessed by an other of the pair of substrate members and the slow axis of the phase difference plate on the side of the other substrate member is selected to be in the range of 100° to 110°, preferably to .mt10 be 105°, the angle ζ contained by the orientation axis of liquid crystal molecules closest to the orientation film possessed by the other of the pair of substrate members and an absorption axis of the polarizing plate on the side of the other substrate member is selected to be in the range of 40° to 50°, preferably to be 45° and the Nz value of the phase difference plates is selected to be 0.2.

Still further, according to the invention, the twist angle φ is selected to be 260°, the angle γ is selected to be in the range of 15° to 25°, preferably 20°, the angle δ is selected to be in the region of 80° to 90°, preferably to be 85°, the angle ε is selected to be in the range of 90° to 100°, preferably o be 95°, the angle ζ is selected to be in the range of 50° to 60°, preferably to be 55°, and the Nz value of the phase difference plates is selected to be 0.3.

It was confirmed that by such selection of he conditions, a liquid crystal display device wherein an extended viewing angle, an achromatic display and excellent viewing angle properties in, for example, both the normal viewing angle direction and the reverse viewing angle direction are achieved can be realized.

The pretilt angle of the liquid crystal molecules is controlled, for example, by illuminating the surface of the material which is to become the orientation film. In other words, when light is irradiated onto the surface of the orientation film material, high energy is supplied to the surface of the material. The molecular structure of the orientation film material is changed depending on this energy. For example, if ultraviolet light is irradiated, ozone ($O_3$) is produced, and this ozone causes oxidation of the organic polymer material such as polyimide or the like, being used as the orientation film material. The chemical molecular structure of the polymer materials is altered by oxidation, and thus the polarity and surface tension of the material surface are also altered. Light irradiation also changes the physical shape of the organic polymer material surface. The orientation film is formed so as to be in contact with the liquid crystal layer, and the orientation state of the liquid crystal molecules is largely dependent on the state of the orientation film surface. Thus, by controlling the light irradiation on the orientation film material surface it is possible to control the pretilt angle of the liquid crystal molecules.

In addition, the pretilt angle may be controlled by make the surface of the orientation film irregular. The irregularities are formed directly in the orientation film surface. Alternatively they may also be formed by firstly making irregularities in, for example, an underlying film to be under the orientation film, as a pretreatment in a certain region of, for example, the electrode, and secondly applying the orientation film thereon. Since the orientation state of the liquid crystal molecules depends largely on the state of the orientation film surface, the pretilt angle of the liquid crystal molecules may also be controlled by forming such irregularities.

In this manner, according to the invention, a phase difference plate wherein $nx \geq nz > ny$ is satisfied and the Nz value is in the range of $0 \leq Nz \leq 0.5$ is situated in a liquid crystal display device, and liquid crystal molecules with different pretilt angles are present in admixture in a single picture element of the liquid crystal display device. As a result, the refractive indexes of the liquid crystal molecules as seen from the opposite viewing angle directions, e.g. the normal viewing angle direction and the reverse viewing angle direction are roughly symmetrical, and the changes in the retardation value as seen from the respective directions are also roughly symmetrical. Consequently, the viewing angle properties as seen from each viewing angle direction are symmetrical and excellent, enabling the provision of a high-quality display liquid crystal display device with an extended viewing angle range. Furthermore, even when color compensation is effected using a phase difference plate, a satisfactory color compensating effect is obtained in both the normal and reverse viewing angle directions, for notable improvement in display quality not only for black and white but also color display.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
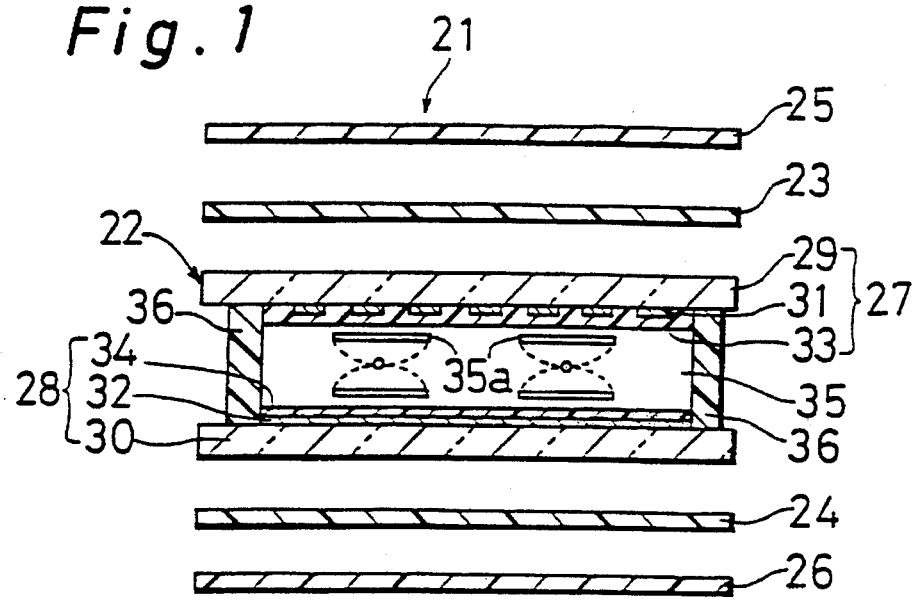
FIG. 1 is a sectional view showing the construction of a liquid crystal display device 21 of an embodiment of the invention.

Now referring to the drawings, preferred embodiments of the invention are described below.

FIG. 1 is a sectional view showing the construction of a liquid crystal display device 21 of an embodiment of the invention. A simple matrix/transparent type liquid crystal display device 21 comprises a liquid crystal display element 22, phase difference plates 23, 24 and polarizing plates 25, 26. The liquid crystal display element 22 is arranged between the polarizing plates 25, 26, and the phase difference plates 23, 24 are each arranged between the liquid crystal display element 22 and each of the polarizing plates 25, 26. The liquid crystal display element 22 is constructed with substrate members 27, 28 and a liquid crystal layer 35 disposed therebetween, and specifically it is constructed in a manner such that the substrate member 27 wherein a transparent electrode 31 and further an orientation film 33 are formed on one surface of a transparent plate 29, and the substrate member 28 wherein in the same manner a transparent electrode 32 and further an orientation film 34 are formed on one surface of a transparent plate 30 are arranged so that the surfaces thereof on the side where the orientation films 33, 34 are formed confront each other at a certain interval, the substrate members 27, 28 are bonded with an adhesive material 36, and a nematic liquid crystal is injected between the substrate members 27, 28.

The transparent plates 29, 30 are composed of, for example, glass or a synthetic resin. The transparent electrodes 31, 32 are composed of, for example, ITO (indium tin oxide) or $SnO_2$, and form mutually parallel strips, while the substrate members 27, 28 are disposed so that the transparent electrodes 31, 32 cross each other at right angles. The display is produced with the liquid crystals lying in the area of intersection between the transparent electrodes 31, 32 as a picture element. The orientation films 33, 34 are composed of, for example, a polyimide resin, and rubbing treatment is performed on their surfaces. The adhesive material 36 is composed of, for example, an ultraviolet curing resin or thermosetting resin. Also, the retardation value of the liquid crystal display element 22, i.e. the product d·Δn of the thickness d of the liquid crystal layer 35 and the refractive index anisotropy Δn of the liquid crystal molecules 35a, selected to be, for example, 860 nm.

The polarizing plates 25, 26 are selected to have, for example, a simplex transmittance of 41.5% and a polarization degree of 99.95%. Also, the phase difference plates 23, 24 are composed of, for example, a uniaxial oriented polymer film made of polycarbonates, and the retardation value thereof is selected to be, for example, 430 nm, while meeting the relationship nx≧nz>ny where nx, ny and nz are the refractive indexes in the three dimensions, and the Nz value is selected to be, for example, 0.2. The Nz value is not limited to 0.2, and may be selected within the range of 0≦Nz≦0.5. In this example, phase difference plates made by NITTO DENKO CORPORATION under the trade name "NRZ" (made of polycarbonate) were used as phase difference plates with such properties.

The above-mentioned Nz value is a value represented by Nz=(nx−nz)/(nx−ny), and phase difference plates with a range of 0≦Nz≦0.5 have optically negative properties, whereas phase difference plates with a range of 0.5<Nz≦1.0 have optically positive properties.

Figure 2:
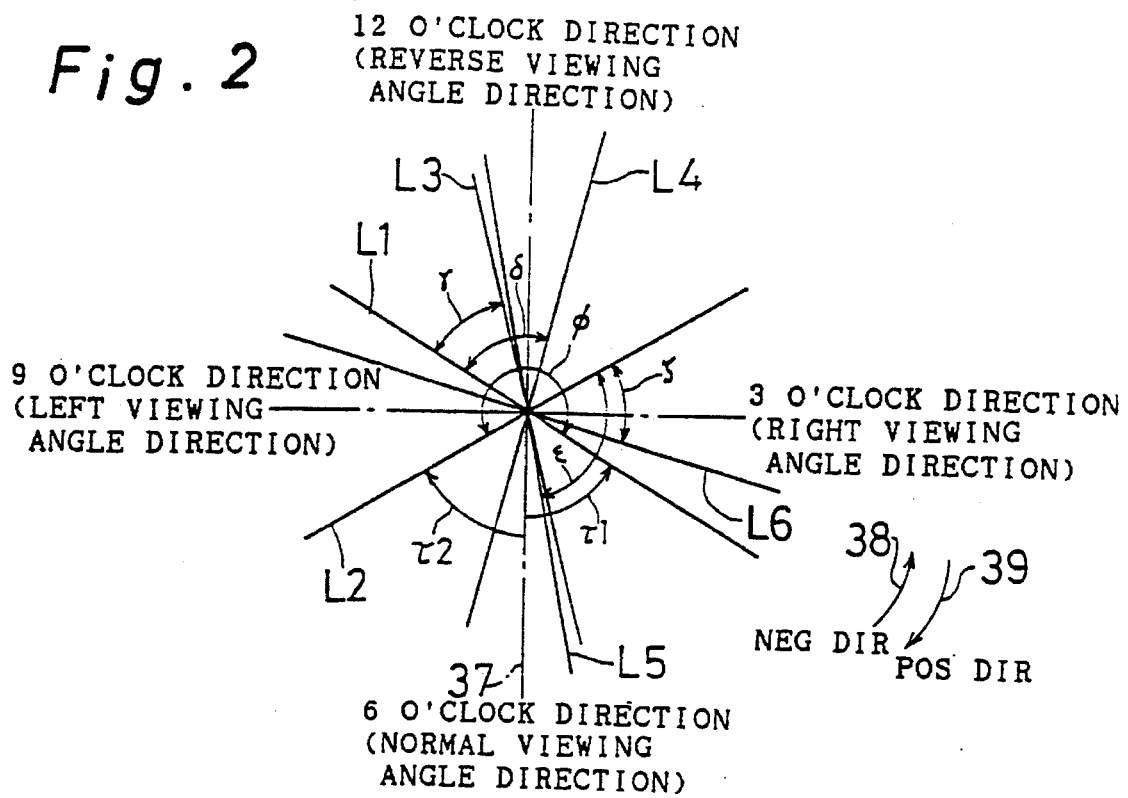
FIG. 2 shows the positional correlation for the above-mentioned liquid crystal display device 21.

FIG. 2 shows the positional relation for the liquid crystal display device 21. L1 indicates the molecular orientation axis of the liquid crystal molecules 35a closest to the orientation film 33 (i.e. the rubbing direction of the orientation film 33), L2 indicates the molecular orientation axis of the liquid crystal molecules 35a closest to the orientation film 34 (i.e. the rubbing direction of the orientation film 34), L3 indicates the absorption axis of the polarizing plate 25, L4 indicates the slow axis of the phase difference plate 23, L5 indicates the slow axis of the phase difference plate 24, and L6 indicates the absorption axis of the polarizing plate 26.

The molecular orientation axis L1 is set to be located in a position angularly displaced exactly by an angle τ1 in the negative direction 38 on the basis of the 6 o'clock–12 o'clock direction (normal viewing angle to reverse viewing angle direction) 37 as seen from directly above the liquid crystal display device 21. Also, the molecular orientation axis L2 is set to be located in a position angularly displaced exactly by an angle τ2 in the positive direction 39 on the basis of the 6 o'clock–12 o'clock direction 37. In addition, the symbol φ in FIG. 2 represents the angle contained by the molecular orientation axis L1 and the molecular orientation axis L2. In this embodiment, the angle φ was selected to be 240° and the above-mentioned angles τ1 and τ2 were both selected to be 60°. The angle φ is selected to be within the range of 180° to 270°.

Also, the symbol γ in FIG. 2 represents the angle contained by the molecular orientation axis L1 and the absorption axis L3 of the polarizing plate 25, and the symbol δ represents the angle contained by the molecular orientation axis L1 and the slow axis L4 of the phase difference plate 23. In addition, the symbol ε represents the angle contained by the molecular orientation axis L2 and the slow axis L5 of the phase difference plate 25, and the symbol ζ represents the angle contained by the molecular orientation axis L2 and the absorption axis L6 of the polarizing plate 26. The angle γ is selected to be in the range of 40° to 50°, preferably to be 45°. The angle δ is selected in the range of 70° to 80°, preferably to be 75°. The angle ε is selected to be in the range of 100° to 110°, preferably to be 105°. The angle ζ is selected to be in the range of 40° to 50°, preferably to be 45°. The constitution conditions mentioned above were selected on the basis of U.S. Pat. No. 5,089,906, U.S. Pat. No. 5,126,866 etc..

Figure 3:
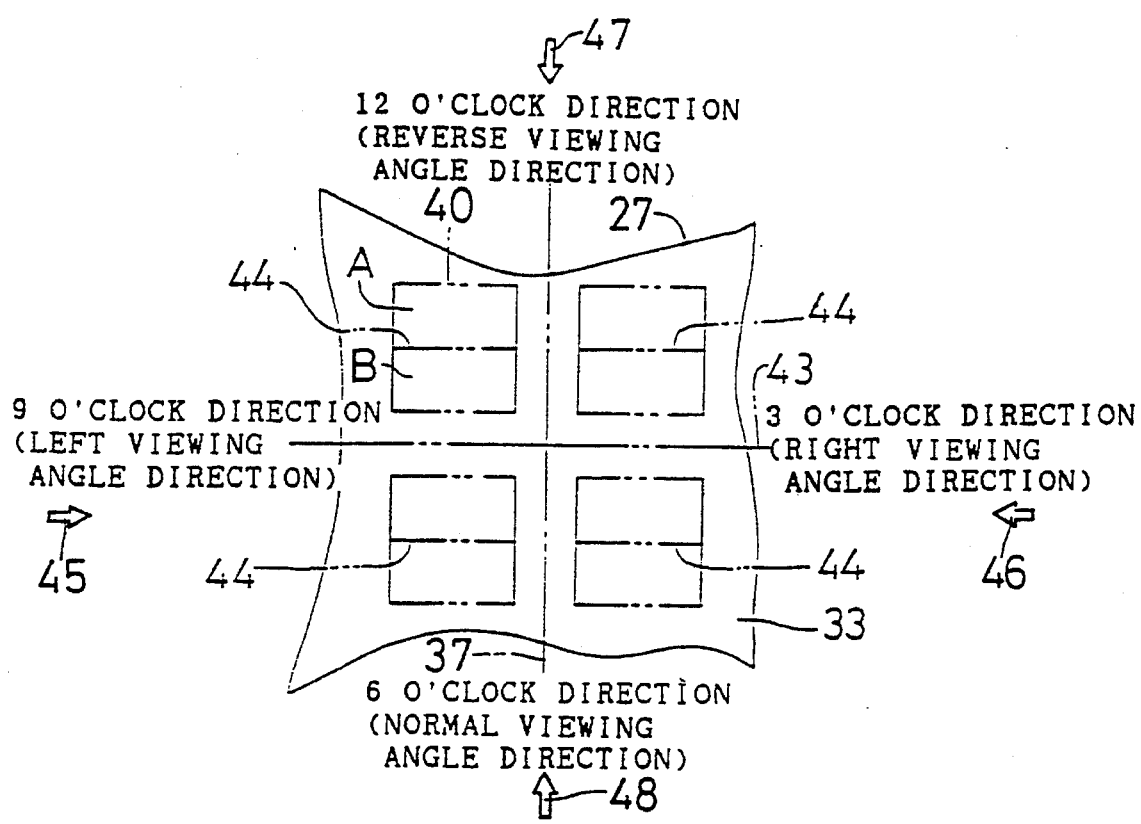
FIG. 3 is a plane view showing the surface of an orientation film 33 of one 27 of a pair of substrate members.

FIG. 3 is a plane view showing the surface of the orientation film 33 of the one substrate member 27. As mentioned above, the liquid crystals lying in the area of intersection between the transparent electrodes 31, 32 are used as picture elements in the liquid crystal display device 21, and matrix displaying is achieved by selectively activating multiple picture elements. The region represented by reference numeral 40 in FIG. 3 is the region of the orientation film surface where the picture elements are located. The region 40 of the orientation film surface consists of two regions A and B whose film surface conditions differ from each other. These two regions A and B are formed by dividing the above-mentioned region 40 into two regions of roughly equal area, by a dividing line 44 assumed to be parallel to the 9 o'clock–3 o'clock direction (left/right viewing angle direction) 43 as seen from directly above the liquid crystal display device 21.

In the same manner, the region of the orientation film 34 surface of the other substrate member 28 where the picture elements are located consists of two regions whose film surface conditions differ from each other. Since the surface conditions of the orientation films 33, 34 differ from each other, the pretilt angles of the liquid crystal molecules closest to the surfaces also differ from each other. In the liquid crystal display device 21 in this embodiment, the substrate members 27, 28 are bonded together so that the surface conditions of the opposing orientation films 33, 34 differ from each other.

Figure 4:
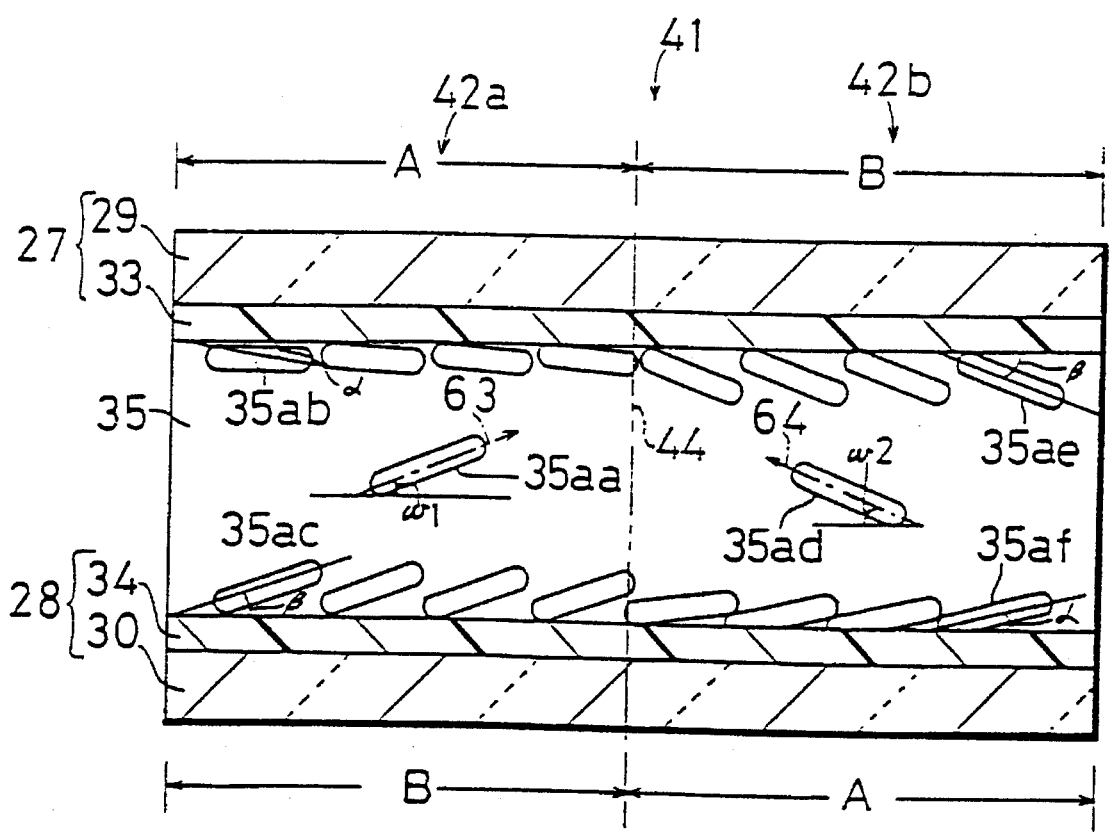
FIG. 4 is an illustrative sectional view showing the orientation state of liquid crystal molecules 35a of one picture element 41.

FIG. 4 is an illustrative sectional view showing the orientation state of liquid crystal molecules 35a of one picture element 41. The liquid crystal molecules closest to the orientation film are generally oriented so that their longitudinal directions are slanted with respect to the orientation film surface. This slanted angle is called the pretilt angle. In the liquid crystal display device 21 of this embodiment, the liquid crystal molecules 35ab, 35af closest to the one section A of the region 40 of the orientation film surface form a pretilt angle α. Also, the liquid crystal molecules 35ac, 35ae closest to the other section B form a pretilt angle β. As mentioned above, since the substrate members 27, 28 are bonded together so that the surface conditions of the opposing orientation films 33, 34 differ from each other, the sections A and B are consequently opposite to each other.

The pretilt angles α and β are both selected to be 20° or less, and selected to be different values. The difference between the pretilt angles α and β is preferably to be 1.5° or more. In this embodiment, α=3° and β=6°. In the following explanation, the picture element 42a is the picture element located in a position where the section A of the orientation film 33 and the section B of the orientation film 34 confront each other, and the picture element 42b is the picture element located in a position where the section B of the orientation film 33 and the section A of the orientation film 34 confront each other. One picture element 41 is composed of the picture element 42a and the picture element 42b.

Figure 5A:
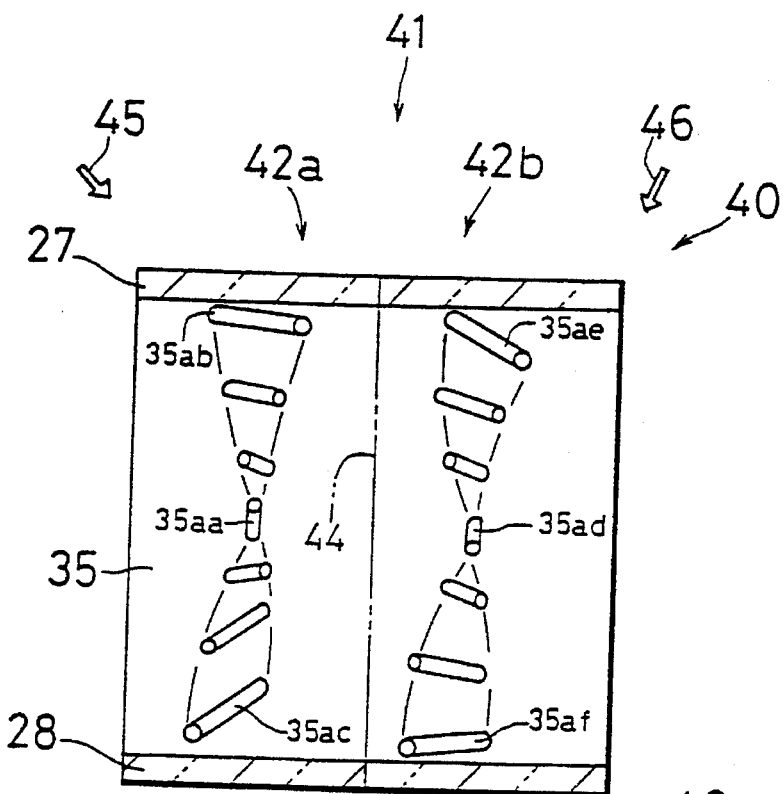
FIGS. 5A, 5B are illustrative sectional views showing the orientation state of the liquid crystal molecules 35a in further detail.
Figure 5B:
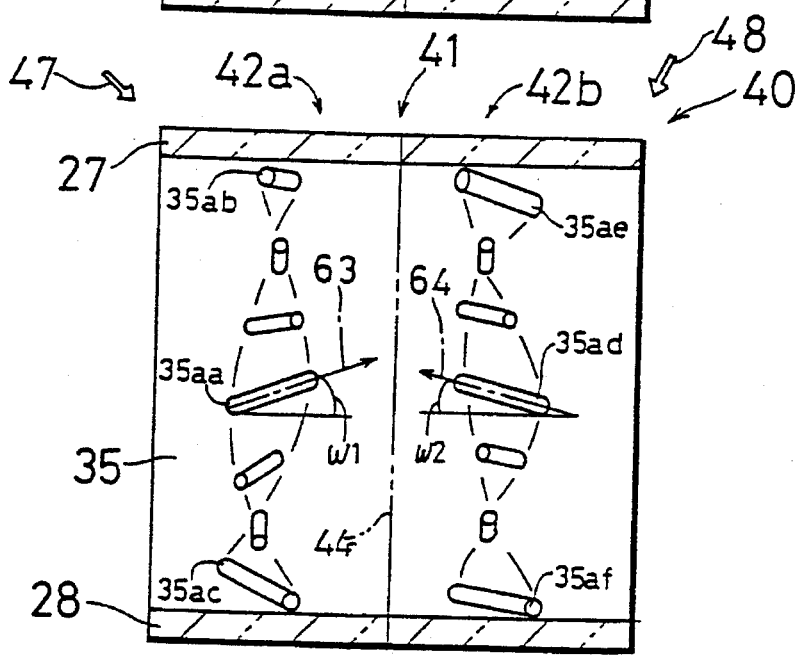

FIGS. 5A, 5B are illustrative sectional views showing the orientation state of the liquid crystal molecules 35a in further detail. FIG. 5A shows the state as seen from the 6 o'clock direction (normal viewing angle direction) 48 shown in FIG. 3, and FIG. 5B shows the state as seen from the 9 o'clock direction (left viewing angle direction) 45. First, the picture element 42a will be explained. The liquid crystal molecules are oriented at a twist angle of 240° between the substrate members 27, 28, and this twist-orientation is followed successively and the liquid crystal molecules are oriented so that the state of each liquid crystal molecule is roughly intermediate among the states of adjacent liquid crystal molecules. Since the pretilt angle β of the liquid crystal molecules 35ac at the side of the substrate member 28 is larger than the pretilt angle α of the liquid crystal molecules 35ab at the side of the substrate member 27, the liquid crystal molecules 35aa located at almost the center of the liquid crystal layer 35 are affected by the pretilt angle β of the liquid crystal molecules 35ac at the side of the substrate member 28, and form a slanted angle ω1(α<ω1<β).

On the other hand, in the case of the picture element 42b as well, since the pretilt angle β of the liquid crystal molecules 35af at the side of the substrate member 27 is larger than the pretilt angle α of the liquid crystal molecules 35af at the side of the substrate member 28, the liquid crystal molecules 35af located in the almost middle of the liquid crystal layer 35 are affected by the pretilt angle β of the liquid crystal molecules 35ae at the side of the substrate member 27, and form a slanted angle ω2(α<ω2<β). The slanted angles ω1, ω2 are smaller than the conventional slanted angle C. Also, the directions slanted with respect to the plane parallel to the orientation film and shown by the arrows 63, 64 are mutually opposite.

Consequently, the retardation values of the liquid crystal element 22, i.e. the products d·Δn of the thickness d of the liquid crystal layer 35 and the refractive index anisotropy Δn of the liquid crystal molecules 35a, as observed from the reverse viewing angle direction 47 and the normal viewing angle direction 48 shown in FIG. 5B, are roughly symmetrical. According to the prior art, since the slanted directions 63, 64 of the above-mentioned liquid crystal molecules 35aa, 35ad are the same direction, when observed from the reverse viewing angle direction 47 and the normal viewing angle direction 48, the products d·Δn are different, and thus even if compensation is made using a phase difference plate made of a uniaxially oriented polymer film, it has not been possible to attain a satisfactory color compensating effect in the reverse viewing angle direction. Nevertheless, it is believed that according to the invention a satisfactory compensating effect is obtained in both the normal and reverse viewing angle directions because the products d·Δn are roughly symmetrical.

Furthermore, as the phase difference plates 23, 24 there are selected ones wherein nx≧nz>ny is satisfied and the Nz value is in the range of 0≦Nz≦0.5. As the viewing angle slants with respect to the liquid crystal display element 22, the retardation value of the liquid crystal display element 22 increases. As the viewing angle with respect to the phase plates 23, 24 having such properties slants, the retardation values of the phase difference plates 23, 24 also increase. That is, the retardation values of the liquid crystal display element 22 and the phase difference plates 23, 24 match when the viewing angle is slanted. Thus, in this embodiment there are situated phase difference plates 23, 24 with their refractive indexes controlled in three dimensions, and thus there is a larger viewing angle range wherein a colorless and satisfactory display is seen due to the color compensating effect. In cases where the phase difference plates used have an Nz value in the range of 0.5<Nz≦1.0, the retardation values decrease as the viewing angle with respect to the phase difference plates slants, and thus there is no matching in retardation value between the liquid crystal display element 22 and the phase difference plates, and the effect described above is not achieved.

In this embodiment, the angles τ1, τ2 based on the 6 o'clock–12 o'clock direction of the molecular orientation axes L1, L2 are both 60°, as shown in FIG. 2, but these angles may be appropriately selected for an improved color compensating effect in the left and right viewing angle directions 45, 46 instead of the normal and reverse viewing angle directions 48, 47.

Figure 6:
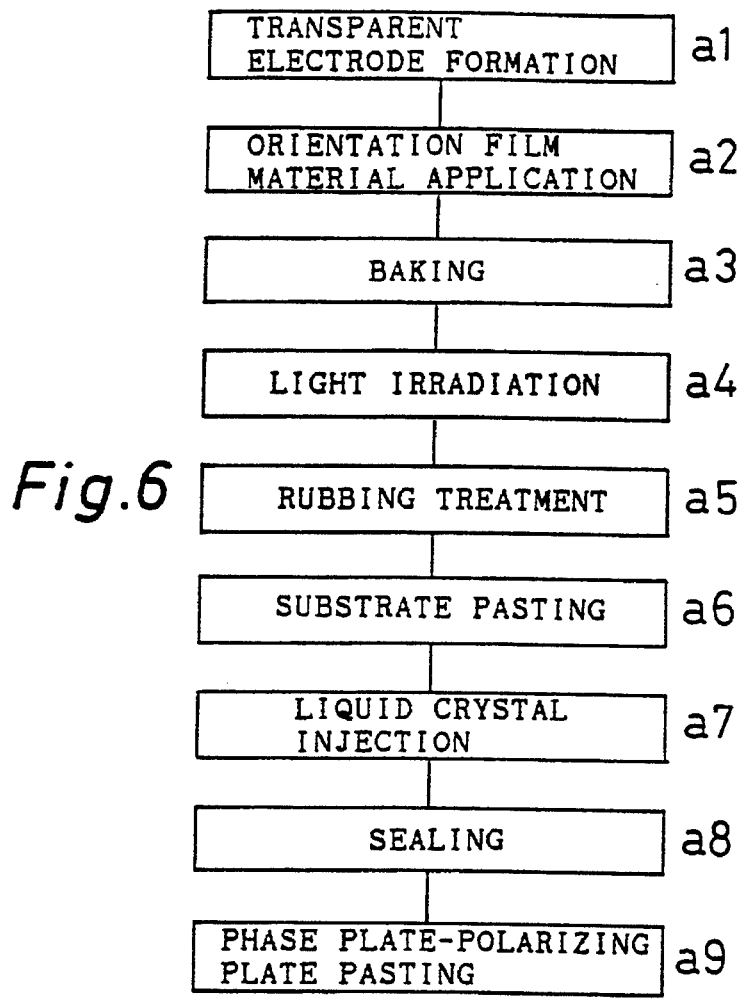
FIG. 6 is a flow chart showing the manufacturing steps of the above-mentioned liquid crystal display device 21.

FIG. 6 is a flow chart showing the manufacturing steps of the above-mentioned liquid crystal display device 21. In step a1, transparent electrodes 31, 32 are patterned on one surface of each of the transparent plates 29, 30. In step a2, a film material which is to serve as the orientation films 33, 34 is applied onto the surfaces of the transparent plates 29, 30 on which the transparent electrodes 31, 32 have been formed. The film material is applied as a solution in a solvent. In step a3, the film material is baked to remove the solvent.

In step a4, light such as ultraviolet light, is irradiated on the surface of the film material. The light used may be, for example, condensed light. Here, the region where the light is irradiated is a section A shown in FIG. 7.

Figure 7:
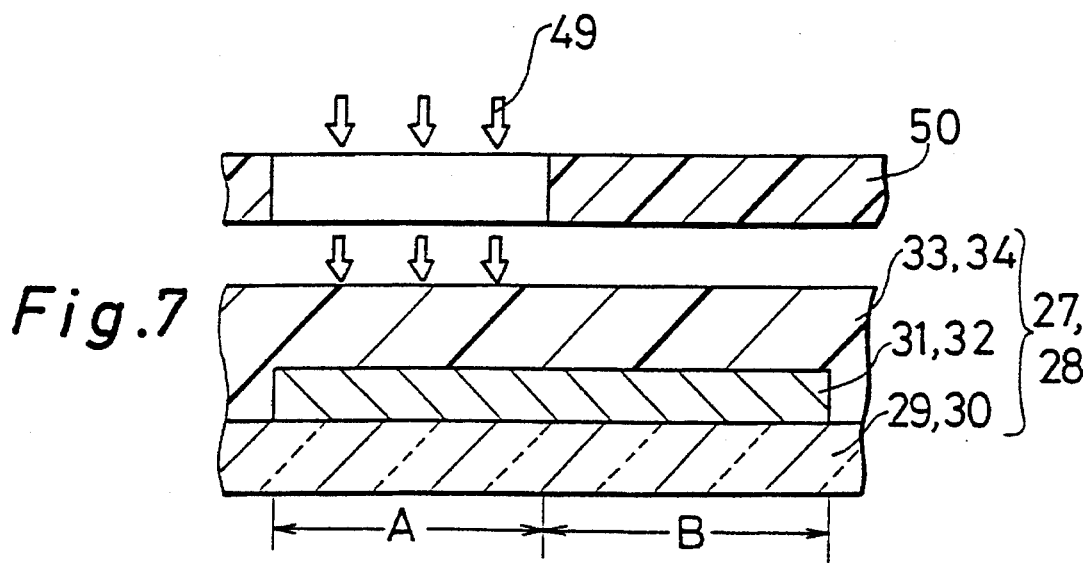
FIG. 7 is a sectional view showing a region A where light irradiation is conducted.

As mentioned above, the section A corresponds to one of the two-divided sections of the, region of the orientation film surface where the picture element is located. Therefore, a mask 50 which transmits the light 49 only in the region corresponding to the section A is placed on the film material and thereafter light irradiation is carried out. A section B in FIG. 7 is the non-light-irradiated region.

In step a5, rubbing is performed on the surface of the film material. The polyimide resin used as the oriented films 33, 34 includes polymer chains, and it is believed that the liquid crystal molecules 35a in contact with the orientation films 33, 34 made of the polyimide resin film are oriented to the direction of the rubbing because the longitudinal direction of the polymer chains in the polyimide resin film surface is oriented to the rubbing direction.

In step a6, the substrate members 27, 28 are arranged so that the surfaces thereof on the side where the orientation films 33, 34 are formed confront each other at a certain interval, and the substrate members 27, 28 are bonded together. At this time, the light-irradiated section A and non-light-irradiated section B of each of the opposed substrate members 27, 28 are selected so as to differ from each other, as shown in FIG. 4.

In step a7, a liquid crystal is injected between the substrate members 27, 28 to form a liquid crystal layer 35. In step a8, the opening through which the liquid crystal was injected is sealed. In step a9, the phase difference plates 23, 24 and polarizing plates 25, 26 are bonded.

The mechanism of control of the pretilt angle by light irradiation in step a4 above will now be explained. High energy is supplied to the surface of the orientation film material in the light-irradiated section A to alter the molecular structure of the surface of the orientation film material. That is, ozone (O₃) is produced due to the irradiation of ultraviolet light, and the orientation film material, i.e. the polyimide resin, is oxidized by the ozone. Specifically, the alkyl groups of the polyimide are oxidized to carbonyl groups. As a result, chemical structural alteration of the resin occurs, and the polarity of the surface of the orientation film material is changed. The surface tension of the surface of the orientation film material also changes.

Figure 8:
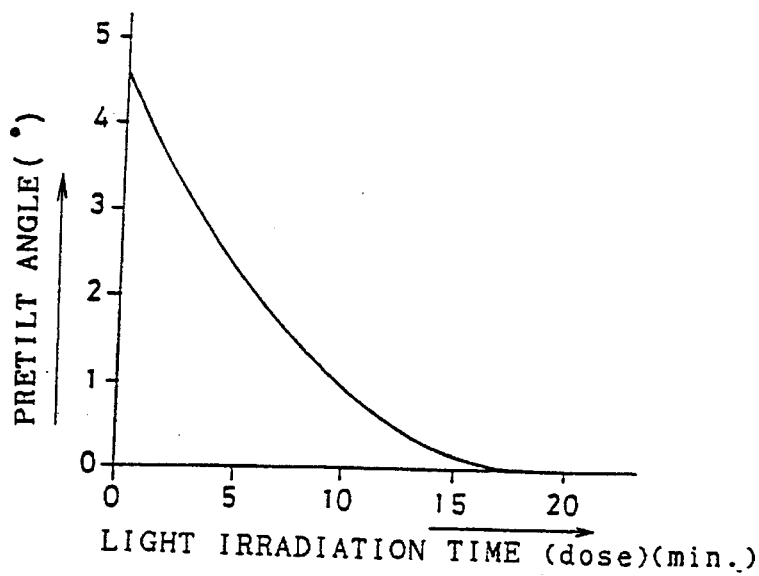
FIG. 8 is a graph showing an example of the correlation between light irradiation time (irradiation amount) and pretilt angle.

FIG. 8 is a graph showing an example of the correlation between light irradiation time (irradiation dose) and pretilt angle. For example, it has been experimentally confirmed that when certain types of polyimide films are used as the orientation film, there is a tendency for the pretilt angle to decrease with longer light irradiation times, i.e. larger doses of light irradiation.

Furthermore, in an alternative mechanism, it has been experimentally established that supplying energy to the orientation film by light irradiation alters the degree of irregularity of the surface of the orientation film. It has also been experimentally established that the alteration in the degree of irregularity of the orientation film surface changes the pretilt angle.

Figure 9:
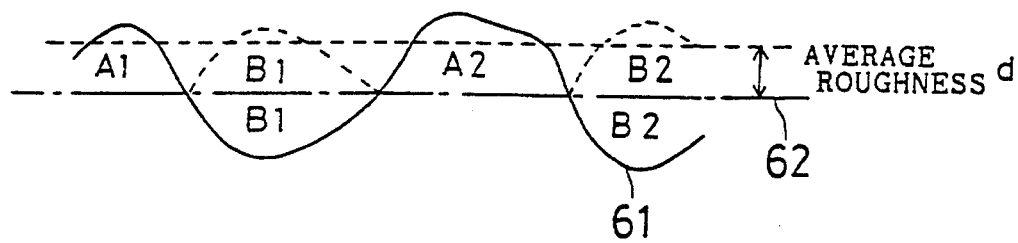
FIG. 9 is a drawing for explanation of the average roughness d which expresses the state of irregularity of film surface.

As one method for expressing the state of film surface irregularity, the average roughness d shown in FIG. 9 is defined. A line 61 in FIG. 9 represents the actual surface of the orientation film, and an alternate long and short dash line 62 represents the center plane of the irregularities of the actual surface 61. Hereinafter the actual surface of the orientation film is represented as "actual surface 61", and the center plane of the irregularities of the actual surface 61 is represented as "center plane 62". The center plane 62 is defined as a surface which satisfies not only the equation (1) below, where An (n being a natural number) is the area of each bump and Bn is the area of each dent of the actual surface 61, but also is parallel to the plane for which the square of the difference in area from the actual surface 61 is smallest.

$$(A1+A2+\ldots+An)=(B1+B2+\ldots+Bn) \tag{1}$$

The average roughness of a film surface is defined as the arithmetical mean of the absolute values of the differences between the center plane 62 and the actual plane 61, and as shown in the figure it is represented by the height d from the center plane 62.

Figure 10:
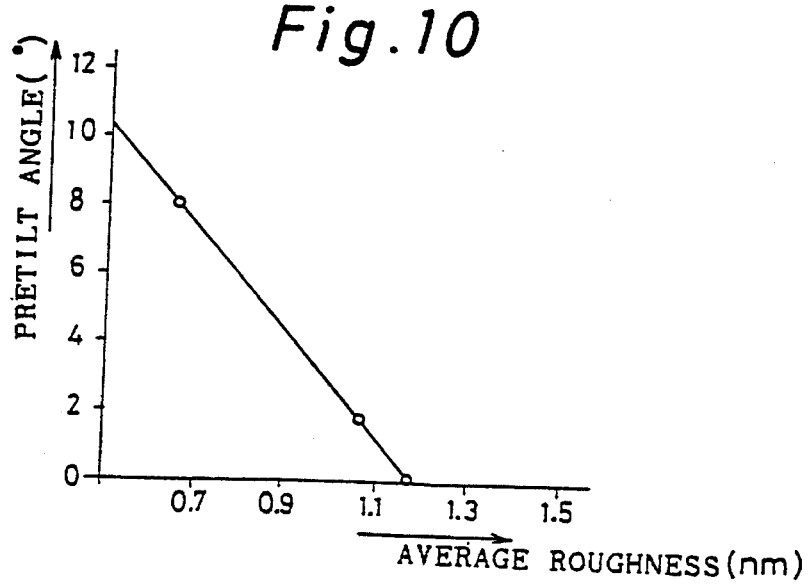
FIG. 10 is a graph showing an example of the correlation between the average roughness d and the pretilt angle.

FIG. 10 is a graph showing an example of the correlation between the average roughness d and the pretilt angle. The pretilt angle is plotted on the vertical axis with the average roughness d on the horizontal axis, and a polyimide film was used as the material for the orientation film in this embodiment; as seen from this figure, the pretilt angle decreases linearly as the average roughness d of the surface of the orientation film increases. Consequently, a desired pretilt angle may be obtained by appropriate selection of the light irradiation conditions, thus allowing control of the pretilt angle.

In this manner, the pretilt angle of the liquid crystal molecules closest to the orientation film is largely dependent on the state of the surface of the orientation film, and in this embodiment the pretilt angle $\alpha$ of the light-irradiated section A is smaller than the pretilt angle $\beta$ of the non-light-irradiated section B. In this embodiment, when the dose of light irradiated on the light-irradiated section A was 10 J, a pretilt angle of $\alpha$ of 3° was obtained.

Figure 11:
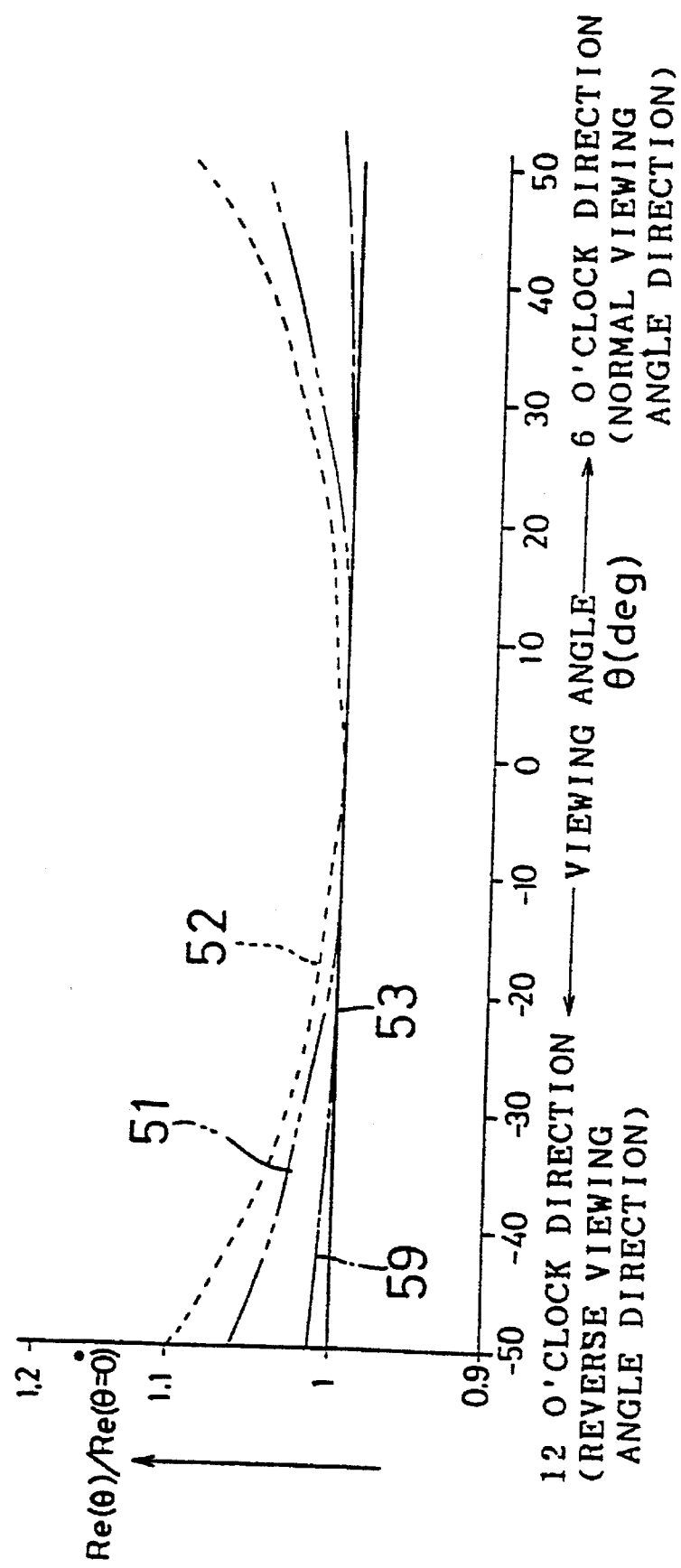
FIG. 11 is a graph showing the change in retardation in the 6 o'clock–12 o'clock direction for liquid crystal display elements of liquid crystal display devices.

FIG. 11 is a graph showing the changes of the retardation value Re in the 6 o'clock–12 o'clock direction (normal viewing angle or reverse viewing angle direction) when a voltage of non-selective waveform is applied to the liquid crystal display element 22 (in the off state). The horizontal axis shows the viewing angle $\theta$ in the 6 o'clock–12 o'clock direction on the basis of a viewing angle $\theta$ of 0° when viewed from directly above. Also, the vertical axis represents the retardation value Re based on the retardation when the viewing angle $\theta$ is 0°. The curve 51 represents the changes of the retardation value Re when the liquid crystal display element 22 of this embodiment is off, the curve 52 represents the changes of the retardation value Re for a phase difference plate whose Nz value is 0, and the curve 53 represents the changes of the retardation value Re for a phase difference plate whose Nz value is 0.5.

From the curve 51, it is clear that roughly symmetrical retardation changes are exhibited in both the normal and reverse viewing angle directions in this embodiment. Also, as seen from the curves 52, 53, the phase difference plates obtained by uniaxially orientation similarly exhibit a symmetrical retardation change. Furthermore, the changes in the curve 51 is in the range of the changes of the curves 52, 53, and thus it is conceivable that when color compensation of his type of liquid crystal display element 22 is performed using phase difference plates, a satisfactory compensating effect is achieved in both the normal and reverse viewing angle directions.

Figure 12:
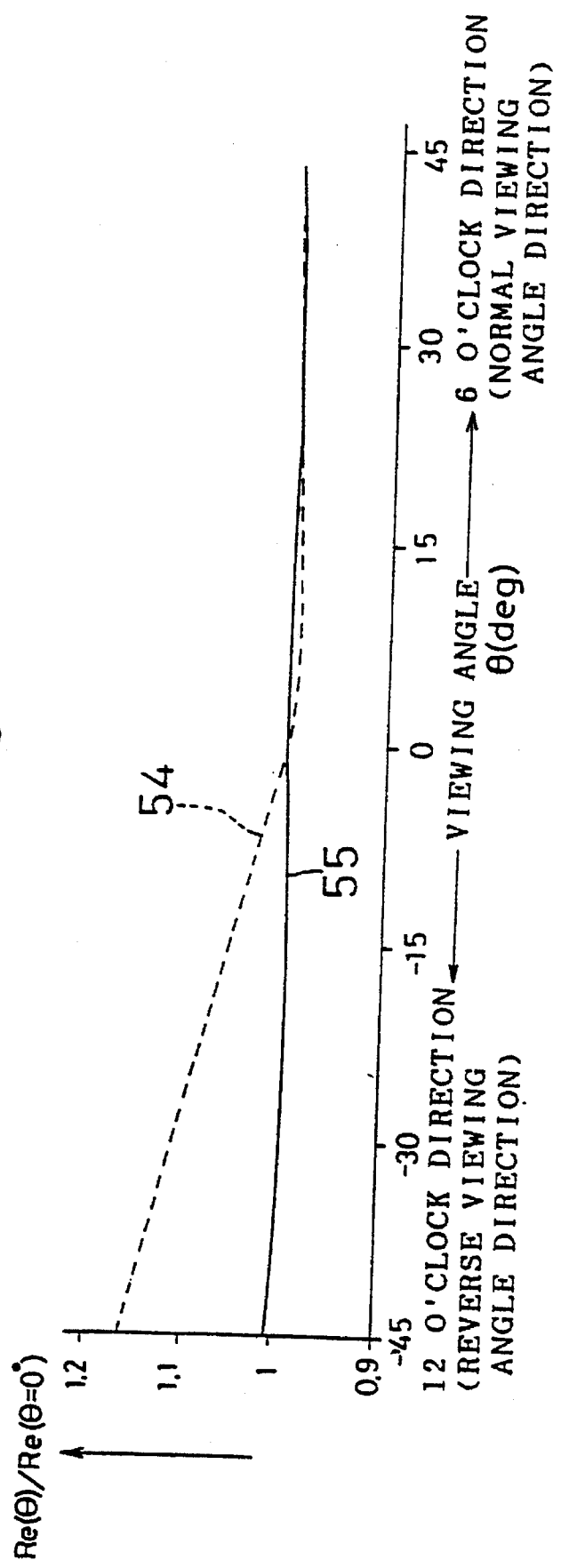
FIG. 12 is a graph showing the change in retardation in the 6 o'clock–12 o'clock direction for a conventional liquid crystal display element.

FIG. 12 is a graph showing the changes of the retardation value Re for a conventional liquid crystal display element as a comparative example. The curve 54 represents the changes of the retardation value Re of the conventional liquid crystal display element, and the curve 55 represents the changes of the retardation value Re of a phase difference plate whose Nz value is 0.4 and whose retardation value is 430 nm. In respect of the conventional liquid crystal display, light irradiation was not carried out at all.

As seen from the curve 54, the changes of the retardation values of the conventional liquid crystal display element in the normal and reverse viewing angle directions are not symmetrical. However, the retardation changes of the phase difference plates are roughly symmetrical in the normal and reverse viewing angle directions, and thus even if color compensation is effected for this type of liquid crystal display element using the phase difference plates, the compensating effect can only be achieved in any one of the viewing angle directions, e.g. the normal viewing angle direction, making it impossible to obtain extended viewing angle properties.

Figure 13:
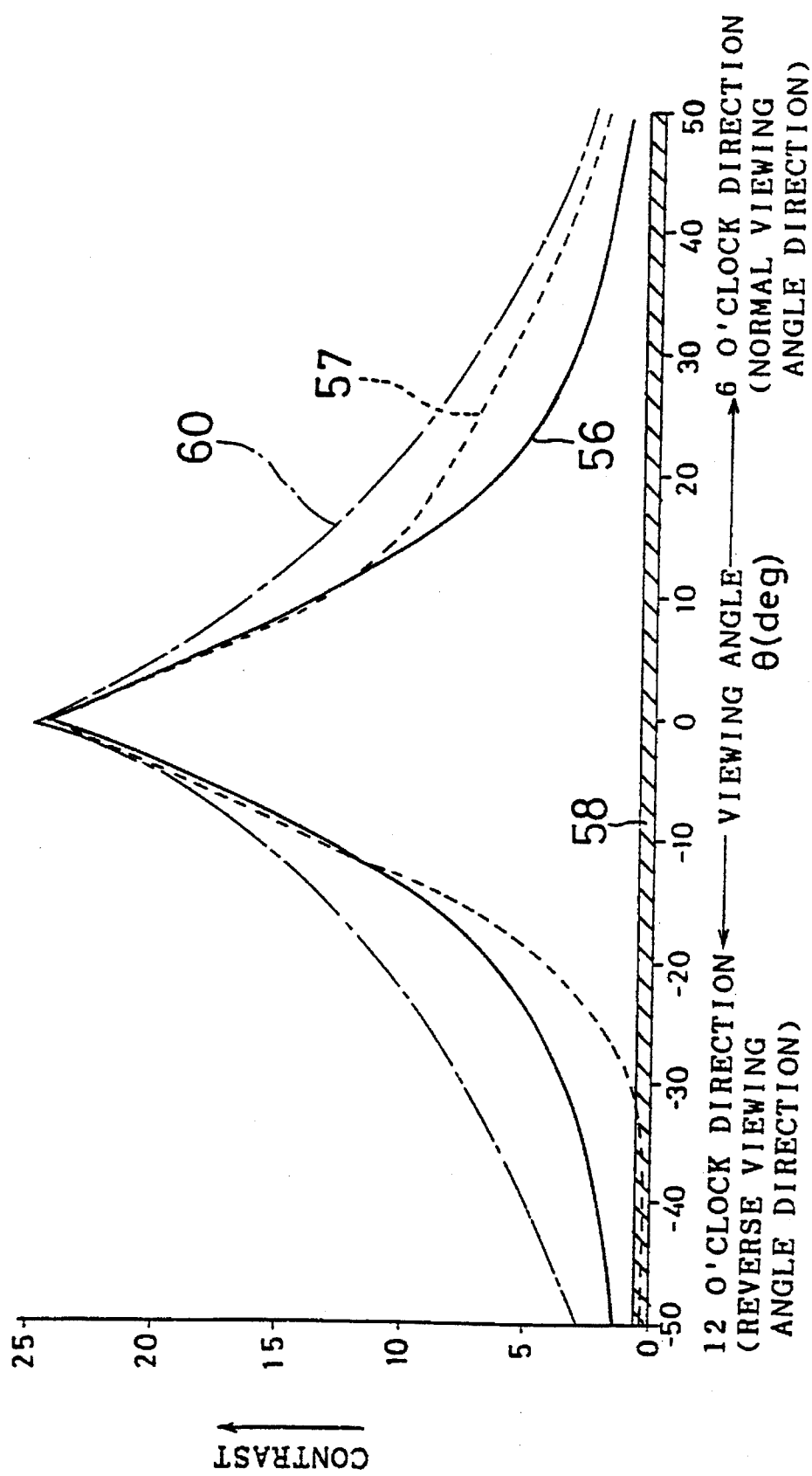
FIG. 13 is a graph showing the in change in contrast the 6 o'clock–12 o'clock direction for liquid crystal display devices.
Figure 14:
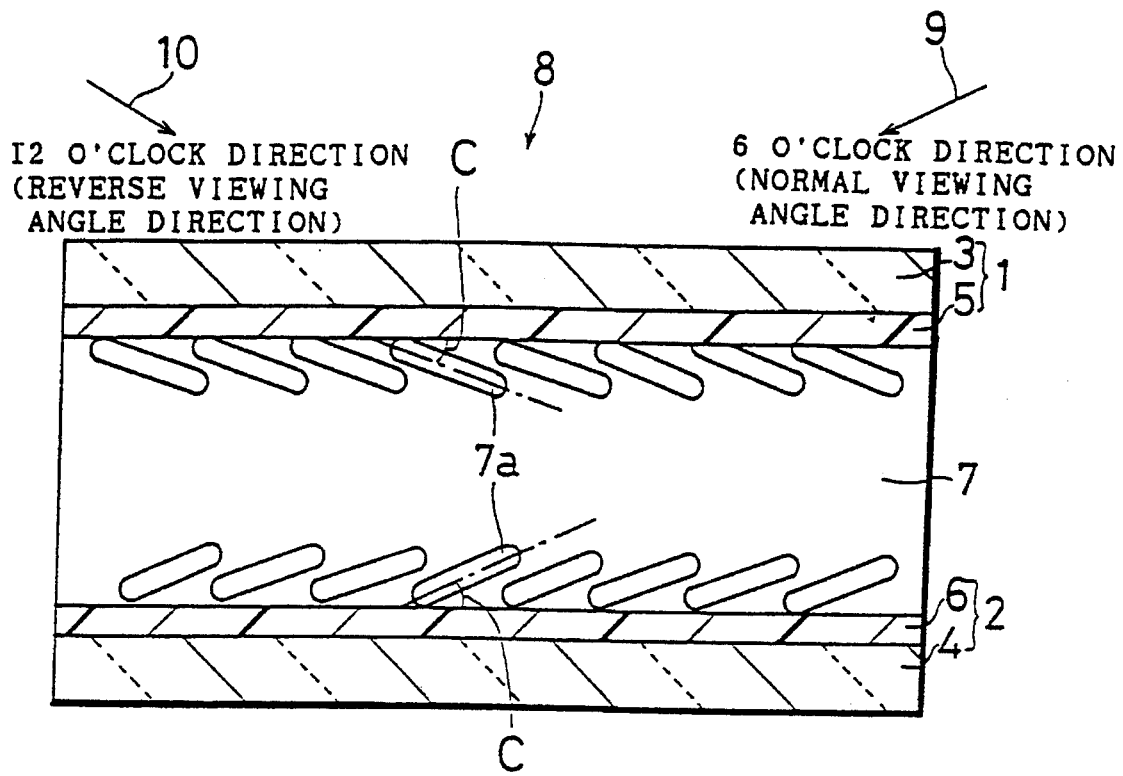
FIG. 14 is a sectional view showing the orientation state of liquid crystal molecules 7a of a conventional liquid crystal display element 8.
Figure 15A:
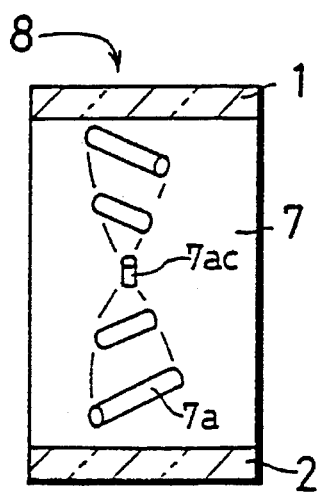
FIGS. 15A, 15B are sectional showing the orientation state of the above-mentioned liquid crystal molecules 7a in further detail.
Figure 15B:
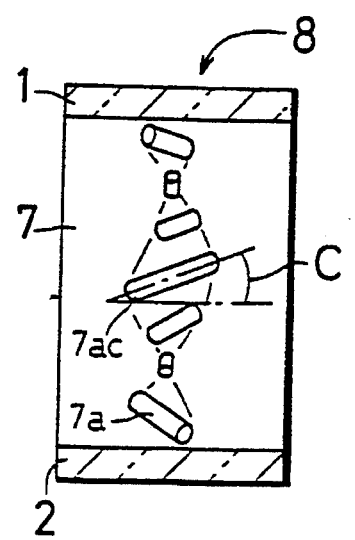
Figure 16:
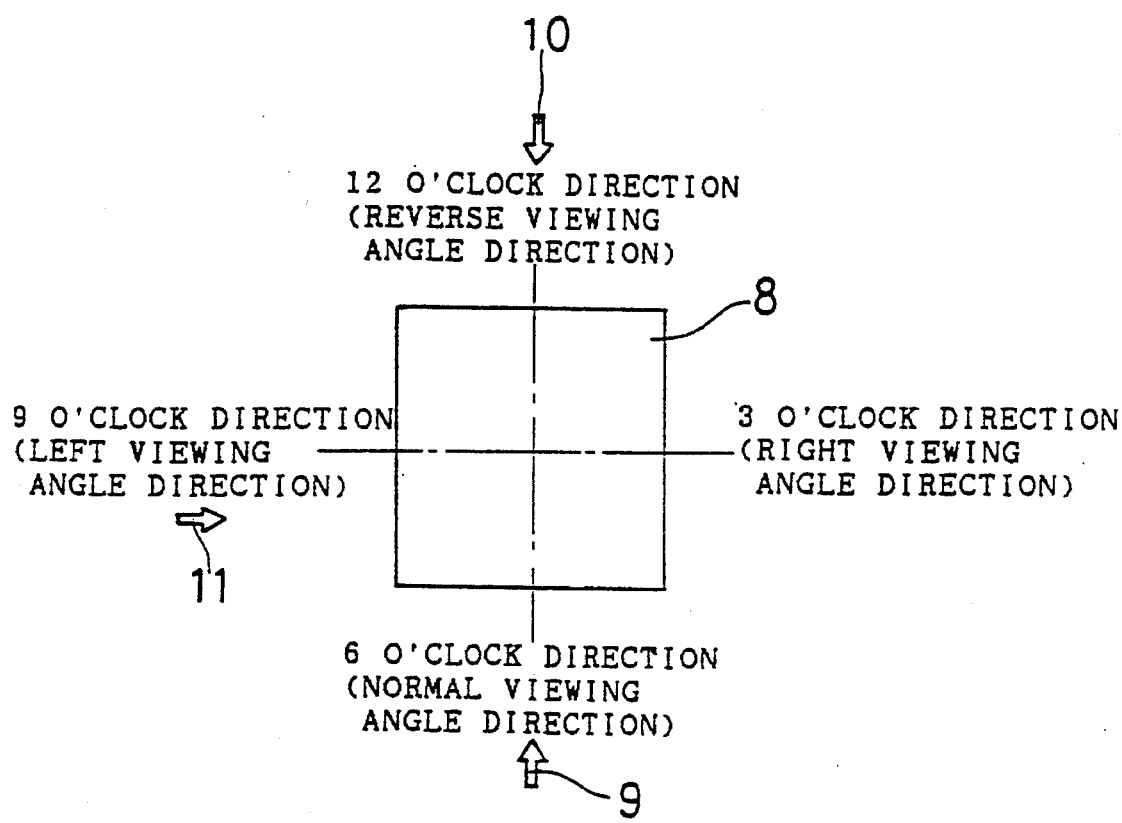
FIG. 16 is a plane view of a conventional liquid crystal display device.

FIG. 13 is a graph showing the changes of contrast Co in the 6 o'clock–12 o'clock direction (normal and reverse viewing angle direction) for this embodiment of the liquid crystal display device 21 and a conventional liquid crystal display device as a comparative example. The horizontal axis shows the viewing angle $\theta$ as the previous graphs, and the vertical axis shows the contrast Co. A curve 56 represents the change for the embodiment of the liquid crystal display device 21 of the present invention and a curve 57 shows the change for the comparative liquid crystal display device.

As seen from the curve 57, the contrasts Co are not symmetrical in the normal and reverse viewing angle directions in the conventional comparative example, and in the reverse viewing angle direction, they are included in the inverted region 58 represented by the diagonal line in the region of a viewing angle $\theta$ of $-33°$ or less. As seen from the curve 56, the contrasts Co are symmetrical in both the normal and reverse viewing angle directions in the present embodiment, and they are not included in the inverted region 58 in either the normal or reverse viewing angle direction. The inverted region 58 is the region where the contrast Co is 1 or less, and it is the region in which the contrast of the display is inverted. Consequently, according to this embodiment there is provided a liquid crystal display device 21 with excellent viewing angle properties in both the normal and reverse viewing angle directions.

In the embodiment explained above, light irradiation was carried out prior to rubbing treatment, but the light irradiation may also follow the rubbing treatment. It may also be performed after application of the orientation film material, after baking the material, after rubbing treatment, after washing which follows the rubbing treatment, etc.

According to this embodiment, it is possible to control the pretilt angle by the simple method of light irradiation, and therefore it is possible to simply control the pretilt angle without relying on labor and cost demanding methods such as varying the shapes of the electrodes, using different materials for the oriented films or changing the rubbing treatment conditions.

Furthermore, in the embodiment explained above, ultraviolet light was used as the light for irradiation, but the light to be used is not limited to ultraviolet light, and may be visible light, infrared light or any combination thereof. Ultraviolet light with a wavelength of 400 nm or less is preferred as a light source by which high energy for alteration of the orientation state may be easily obtained. Irradiation of light with this wavelength may be carried out easily by using, for example, a high pressure mercury lamp. In the case of irradiation with ultraviolet light, it is preferably carried out under conditions of 1000 mJ/cm$^2$ to 10,000 mJ/cm$^2$.

In addition to ultraviolet light, a laser beam with a wavelength of visible light, infrared light or a combination thereof may also be used. In this case, the efficiency is enhanced since laser energy is added to the energy of the wavelength of the light.

Irradiation with another energy beam instead of light irradiation may also be used to locally change the orientation properties of the orientation films 33, 34. The chemical structure of the orientation films 33, 34 may be locally altered by irradiation with, for example, an electron beam, an ion beam, X-rays, etc.

Because minute working using a mask or condensed light is possible up to the order of a few microns, this method may be used to form minute areas with different orientation properties and any desired plane form in the oriented films 33, 34. In addition, the light intensity between the irradiated sections may be varied, instead of simply distinguishing the areas by whether light-irradiated or non-light-irradiated. Furthermore, all of the regions may be irradiated with light, varying the intensity of the irradiated light every predetermined region (for example, every picture element unit mentioned above). It is possible to vary the orientation properties more minutely and regionally by light irradiation patterns.

In this embodiment, a polyimide film was used for the orientation films 33, 34, but orientation films 33, 34 made of other materials may also be used. Such other materials include resins consisting mainly of polyamide, polystyrene, polyamidoimide, epoxy acrylate, spiran acrylate, polyurethane, and the like. An appropriate wavelength of light to be irradiated may be selected depending on the type of material.

In addition, there may be used an inorganic orientation film consisting mainly of silicon nitride, silicon oxide, magnesium fluoride, gold, or the like, in which case irradiation with high-energy light such as ultraviolet laser or an electron beam is necessary.

Furthermore, the embodiment explained above is a case of a simple matrix-type transparent liquid crystal display device 21, but the same effect may be obtained not only with simple matrix types but also active matrix types. The application to reflective types is also within the scope of the invention.

Furthermore, in the embodiment explained above, the state of the orientation film surface is controlled by light irradiation, and the film is used to form a liquid crystal display device 21, but cases in which the orientation film is applied to uses other than the liquid crystal display device 21 are also within the scope of the invention.

Moreover, in the embodiment explained above, light irradiation is performed as a method of controlling the pretilt angle, but cases in which the control is effected by other methods are also within the scope of the invention. For example, irregularities may be formed in the orientation film surface without light irradiation. The irregularities may be directly formed in the orientation film surface, or they may be formed in the film just under the orientation film, such as on the surface of the electrode, and the orientation film applied thereon. Alternatively, an underlying film with irregularities on its surface may be formed on the electrode and the orientation film formed over the underlying film. The method used to form the irregularities may be a method in which the film surface is contacted with an acid or alkali solution, or a method in which it is contacted with a reactive gas or plasma-state gas.

In an embodiment of a liquid crystal display device of the invention, which has the same constitution as the liquid crystal display device 21 and a different positional relationship among the comprising members from the liquid crystal display device, the angle $\phi$ is selected to be 260°, and the angles $\tau 1$, $\tau 2$ are both selected to be 50°. The angle $\gamma$ is selected to be in the region of 15° to 25°, preferably to be 20°, the angle $\delta$ is selected to be in the region of 80° to 90° preferably to be 85°, the angle $\epsilon$ is selected to be in the range of 90° to 100°, preferably to be 95°, and the angle $\zeta$ is selected to be in the range of 50° to 60°, preferably to be 55°.

The Nz value of the phase difference plates is selected to be 0.3. Conditions other than those mentioned above are selected in the same manner as the foregoing liquid crystal display device 21. It was confirmed that such liquid crystal display device has also excellent viewing angle properties like the foregoing liquid crystal display device 21.

A curve 59 in FIG. 11 and a curve 60 in FIG. 13 show the changes of retardation value Re and contrast Co in the liquid crystal display device of the present embodiment, respectively. As seen from the figures, also in the present embodiment, the changes of retardation value in the normal viewing angle direction and reverse viewing angle direction are symmetric. Thus it is conceivable that excellent color compensation effect is achieved using phase difference plates in both the normal and reverse viewing angle directions. Additionally, as seen from the figures, the contrasts Co in the normal and reverse viewing angle directions are nearly symmetric, and they are not included in the reverse region 58. Thus, also the present embodiment presents a liquid crystal display device with excellent viewing angle properties.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display device comprising:
   a) a pair of polarizing plates;
   b) a liquid crystal display element disposed between the pair of polarizing plates, the element including:
      a pair of substitute members at least one of which is transparent, and a
      a super twisted nematic-type liquid crystal layer of the liquid crystal molecules having a twist angle $\phi$ of 240°, the liquid crystal layer sandwiched between the substrate members,
      the pair of substrate member each including both an electrode for applying a voltage to the liquid crystal layer and an orientation film in contact with the liquid crystal layer; and
   c) phase difference plates placed between each of the pair of polarizing plates and the liquid crystal display element, wherein
      the liquid crystal layer interposed between the electrodes is used as picture elements;
      the liquid crystal molecules with different pretilt angles are mixed in a single picture element;
      the phase difference plates are selected so that $nx \geq nz > ny$ is satisfied and the value of Nz represented by $Nz=(nx-nz)/(nx-ny)$, where the Nz value is 0.2 and where nx, ny and nz are the refractive indices in the three-dimensional directions of each phase difference plate;
      the angle $\gamma$ contained by an orientation axis of liquid crystal molecules closest to the orientation film possessed by a one of the pair of substrate members and an absorption axis of the polarizing plate on the side of the one substrate member is selected to be in the range of 40° to 50°;
      the angle $\delta$ contained by said orientation axis and the slow axis of the phase difference plate on the side of the one substrate member is selected to be in the range of 70° to 80°;
      the angle $\epsilon$ contained by an orientation axis of liquid crystal molecules closest to the orientation film possessed by an other of the pair of substrate members and the slow axis of the phase difference plate on the side of the other substrate member is selected to be in the range of 100° to 110°; and the angle ζ contained by the orientation axis of liquid crystal molecules closest to the orientation film possessed by the other of the pair of substrate members and an absorption axis of the polarizing plate on the side of the other substrate member is selected to be in the range of 40° to 50°.

2. The device of claim 1, wherein the angles γ, δ, ε, ζ, are selected to be 45°, 75°, 105°, and 45°, respectively.

3. A liquid crystal display device comprising:

a) a pair of polarizing plates;

b) a liquid crystal display element disposed between the pair of polarizing plates, the element including:

a pair of substitute members at least one of which is transparent, and a a super twisted nematic-type liquid crystal layer of the liquid crystal molecules having a twist angle φ of 260°, the liquid crystal layer sandwiched between the substrate members, the pair of substrate member each including both an electrode for applying a voltage to the liquid crystal layer and an orientation film in contact with the liquid crystal layer; and c) phase difference plates placed between each of the pair of polarizing plates and the liquid crystal display element, wherein the liquid crystal layer interposed between the electrodes is used as picture elements;

the liquid crystal molecules with different pretilt angles are mixed in a single picture element;

the phase difference plates are selected so that nx≧nz>ny is satisfied and the value of Nz represented by Nz=(nx−nz)/(nx−ny), where the Nz value is 0.3 and where nx, ny and nz are the refractive indices in the three-dimensional directions of each phase difference plate;

the angle γ contained by an orientation axis of liquid crystal molecules closest to the orientation film possessed by a one of the pair of substrate members and an absorption axis of the polarizing plate on the side of the one substrate member is selected to be in the range of 15° to 25°;

the angle δ contained by said orientation axis and the slow axis of the phase difference plate on the side of the one substrate member is selected to be in the range of 80° to 90°;

the angle ε contained by an orientation axis of liquid crystal molecules closest to the orientation film possessed by an other of the pair of substrate members and the slow axis of the phase difference plate on the side of the other substrate member is selected to be in the range of 90° to 100°;

the angle ζ contained by the orientation axis of liquid crystal molecules closest to the orientation film possessed by the other of the pair of substrate members and an absorption axis of the polarizing plate on the side of the other substrate member is selected to be in the range of 50° to 60°.

4. The device of claim 3, wherein the angles γ, δ, ε, ζ are selected 20°, 85°, 95°, and 55°, respectively.

* * * * *